Jan. 15, 1946.  A. OLEVIN  2,392,940
ELECTRICAL CONDUIT FITTING
Filed Aug. 5, 1943  2 Sheets-Sheet 1
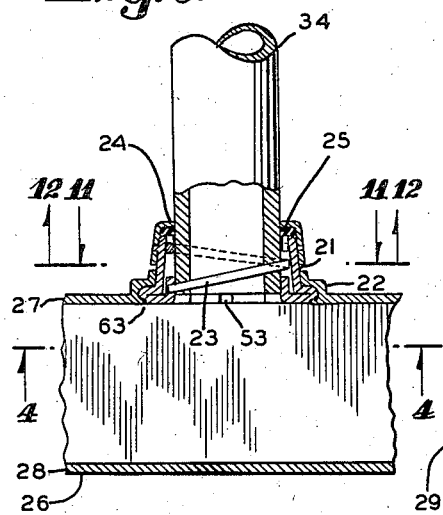
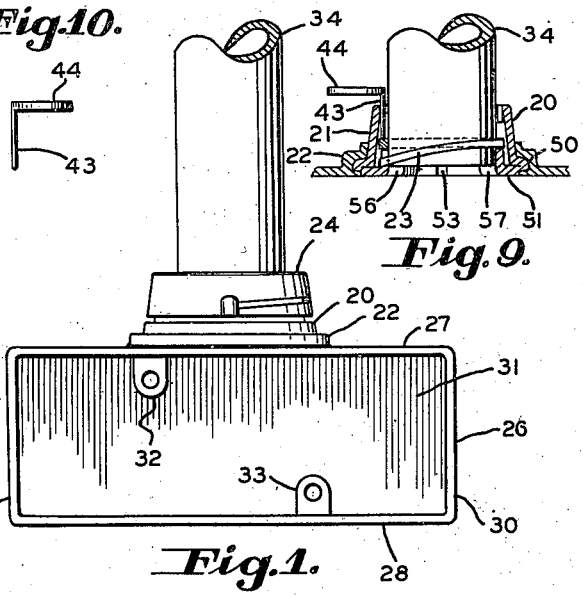
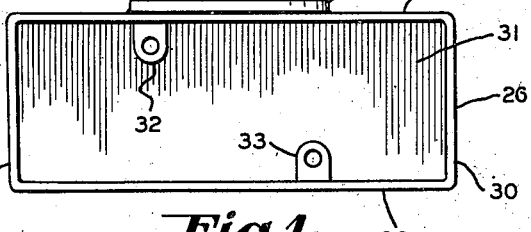
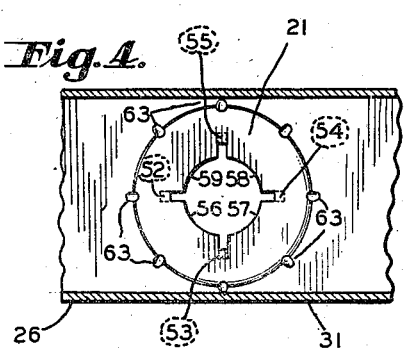
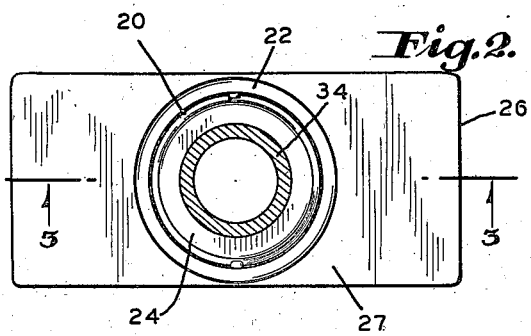
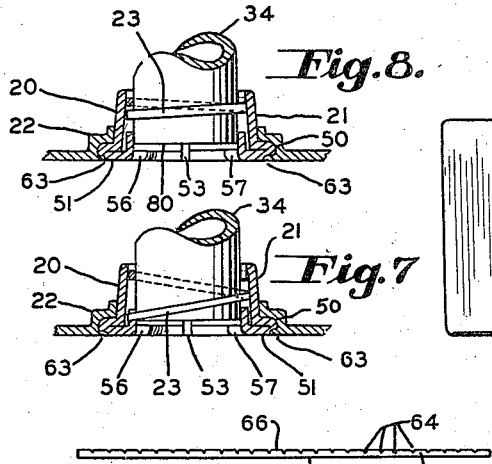
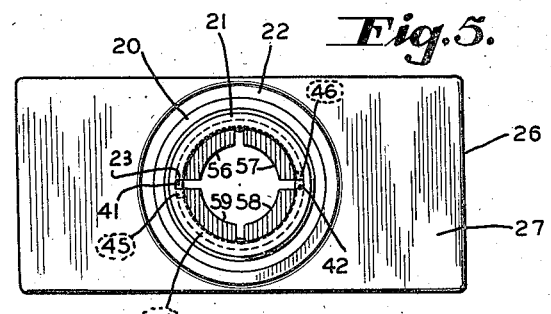
ADOLPH OLEVIN
INVENTOR
BY Richard S. Jemko
ATTORNEY Jan. 15, 1946.                A. OLEVIN                    2,392,940
                        ELECTRICAL CONDUIT FITTING
                        Filed Aug. 5, 1943           2 Sheets-Sheet 2

ADOLPH OLEVIN
INVENTOR

BY Richard S. Temko
ATTORNEY

Patented Jan. 15, 1946

2,392,940

UNITED STATES PATENT OFFICE 2,392,940

ELECTRICAL CONDUIT FITTING

Adolph Olevin, Brooklyn, N. Y.

Application August 5, 1943, Serial No. 497,527

6 Claims. (Cl. 285—182.1)

This invention relates generally to electrical conduit fittings or boxes and more particularly to devices of this class in which the connection between the conduit and the fitting or box is instantaneously operated.

Among the principal objects of the present invention lies the provision of a device of the class described in which the connection between the conduit and the fitting or box is accomplished without the use of threads on either of the parts.

Another object herein lies in a provision of a structure of the class described in which only a simple engaging and pushing operation is necessary to inter-connect the parts.

Another object herein lies in the provision of the devices of the class described in which the parts may be rapidly disengaged where necessary by the simple insertion of a pin into the fitting or box.

An advantage which flows from the fact that the parts need not be provided with threads, is that the workman or installer need only sever the end of the conduit to form the proper length thereof and to engage the parts. No threading need be done on the job and the protective rust-resisting coat or plating upon the conduit is not damaged or broken through as is the case when threading is performed.

Another object herein lies in the provision of a conduit engaging fitting or box in which the grip of the fitting or box increases in correlation with the tension upon the conduit.

A still further object herein lies in the provision of a structure of the class described in which undesirable axial rotation of the conduit is prevented after the same has become seated and engaged by the fitting or box.

Another object herein lies in the provision of a conduit box in which the penetration of the conduit into the box is controlled and predetermined.

Another object herein lies in the provision of an electrical conduit connection box which is readily adapted for indoor or outdoor use, and when adapted for the latter use, has provision for preventing the entrance of water therein so as to be substantially weather-tight.

A feature of the invention lies in the fact that the conduit receiving nipple portions thereof are securely integrated with the box without the use of welding, brazing or soldering, and yet the construction is durable and readily manufactured in large scale at low cost.

These objects and other incidental ends and advantages will more fully appear in the progress of this disclosure and be pointed out in the appended claims.

In the drawings in which similar characters designate corresponding parts throughout the several views:

Figure 1 is a front elevational view of an embodiment of the invention in closed condition, as set up for outdoor use and engaging an end of a piece of conduit. In this view the cover plate is removed from the box.

Figure 2 is a top plan view of Figure 1.

Figure 3 is a fragmentary central vertical sectional view as seen from the plane 3—3 on Figure 2.

Figure 4 is a fragmentary sectional view as seen from the plane 4—4 on Figure 3.

Figure 5 is a top plan view taken similarly to Figure 2 but with the conduit and the weatherproofing cap removed.

Figure 6 is an elevational view of the scored blank from which the gripping element is subsequently formed.

Figure 7 is a fragmentary central vertical sectional view showing schematically the first stage in the engagement of a conduit end by the fitting element.

Figure 8 is a view corresponding to Figure 7 but showing the second stage in the engagement of the conduit end in the fitting element.

Figure 9 is a view corresponding to Figure 8 but shows the parts as altered in position for removal of the conduit end from the fitting element, the removing or conduit releasing tool being shown in engagement and actuating the gripping spring element.

Figure 10 is an elevational view of the conduit removing or spring releasing tool.

Figure 11:
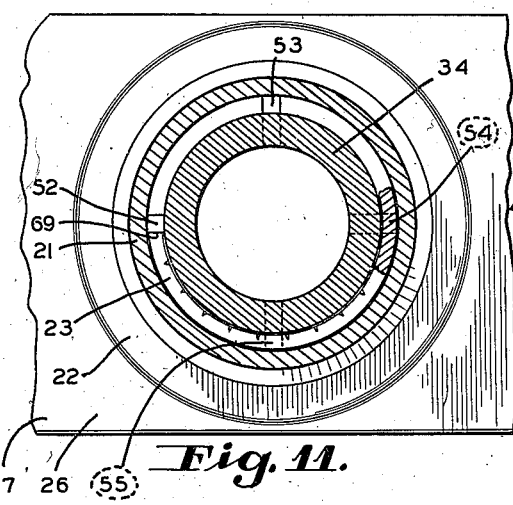
Figure 11 is an enlarged fragmentary horizontal sectional view as seen from the plane 11—11 on Figure 3.

In accordance with the preferred embodiment of the invention, the electrical conduit fitting generally indicated by numeral 20 includes a nipple element 21; a retainer element 22; and a gripping spring element 23. As will more fully appear hereinbelow, the fitting may also have associated therewith a weather-proof cap 24 and gasket 25.

Since the purpose of the electrical conduit fitting is to mechanically engage the end of an electrical conduit with either another end of an electrical conduit or with some connection box, it will be obvious to those skilled in the art to which the present invention relates, that the present fitting element may be incorporated in all manner of connection boxes or may be associated in an end to end relationship so as to form a junction or connector for two juxtaposed ends of axially aligned conduits. By way of example, I have shown in the drawings, the fitting element as indicated with connection to a so-called T box in which the greatest length of the box is disposed substantially perpendicularly to the end of the conduit which enters the box substantially centrally of one of the long walls thereof. Thus, in Figure 1 the connection box is generally indicated by numeral 26 and includes a top wall 27; a bottom wall 28; end walls 29 and 30; and a rear wall 31. The forward portions of the top and bottom walls 27 and 28 are provided with threaded orificed ears 32 and 33, which are adapted to receive the attaching screws of the usual cover plate, well known in the art, said screws and cover plate not being illustrated in the drawings for purposes of clarity. Having blank walls, the box 26 may have any suitable electrical device associated with the cover of the box (not shown) or as will be obvious to those skilled in the art, any of the walls may be provided with "knockouts," or with additional fitting elements for connecting other conduits leaving the box in directions generally perpendicular to the particular wall of the box upon which such additional fitting elements are located. The conduit generally indicated by numeral 34 may be of the standard thick or thin wall type and it will be understood that the fitting elements in actual process are constructed in a range of sizes to coact with the standard external diameters of thin or thick wall conduits.

The nipple element 21 is generally of cylindrical shape and is preferably formed up from sheet material such as steel or brass. Thus, the body portion 35 of the nipple element 21 has the outer wall 36 and the inner wall 37 thereof tapering toward the relatively outer end 38 thereof. This taper or convergence of the walls is relatively of low order, as for example, four degrees.

Figure 12:
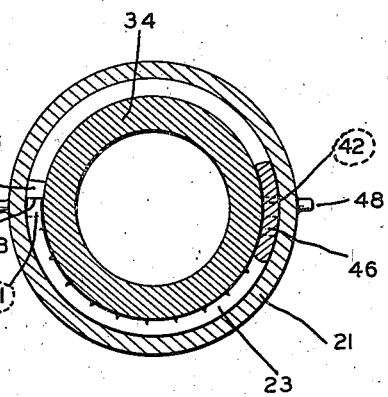
Figure 12 is an enlarged fragmentary horizontal sectional view as seen from the plane 12—12 on Figure 3.
Figure 13:
Figure 13 is a fragmentary vertical sectional view of a piece of strip stock or a blank in the first stage preparatory to the blanking and forming operations which produce the retainer element.

The outer end 38 of the nipple element 21 has an inwardly extending outer flange 39. The inner vertical edge 40 of the flange 39 has an effective diameter substantially equal to or slightly greater than the effective external diameter of the particular size of conduit 34 with which it is desired the fitting 20 shall be used. Diametrically and oppositely arranged in the flange 39 are a pair of cut-outs 41 and 42 which serve to permit passage therethrough of the pin 43. This pin which is used to disengage the conduit 34 from the fitting 20 when desired is provided with a handle 44, and its operation will be described fully hereinbelow. The cut-outs 41 and 42 may be produced by making a pair of L shaped cuts in the flange 39 and inwardly bending the tabs so formed, thereby forming the spring outer detents 45 and 46. The outer detents 45 or 46 are adapted to prevent counterclockwise rotation as viewed in Figure 12 of the spring element 23.

Adjacent the outer end 38, the body portion 35 of the nipple element 21 is provided with a pair of radially outwardly extending protuberances 47 and 48 which are adapted to engage the weatherproofing cap 24. These protuberances may be produced by deforming the material of which the nipple is composed or by inserting separate pins.

The inner end 49 of the nipple element 21 is irregularly formed as seen in the drawings and includes a radial folded rim 50, an inwardly extending inner flange 51. The flange 51 is radially severed by a plurality of pairs of cuts to form tabs which are upwardly bent, as shown in Figure 3 to form the spring inner detents and conduit guides 52, 53, 54 and 55. The innermost portions of the flange 51 which remain between the guides 52-55 inclusive, form the conduit detents 56, 57, 58 and 59. The guides 52-55 inclusive, have the inner opposed surfaces thereof perpendicularly disposed with relation to the inner flange 51, and the upper surfaces detents 56-59 inclusive. The distance between any diametrically opposite pair of guides 52, 53, 54 and 55, is substantially equal to or slightly greater than the effective external diameter of the particular size of conduit 34 which it is desired the fitting 20 shall be used. The distance between any diametrically opposite portions of the conduit detents 56, 57, 58 and 59 is substantially equal to or slightly greater than the largest internal diameter of the particular size of conduit 34 with which it is desired the fitting 20 shall be used.

Figure 15:
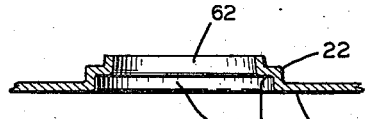
Figure 15 is a fragmentary vertical sectional view showing the second forming and blanking operation in the production of the retainer element.

The retainer element 22 (see Figure 15) comprises a base 60, a nipple rim retaining rabbet 61, and an internally and outwardly tapered nipple body retaining neck 62. The shape and size of the rabbet 61 and the neck 62 are such that they will receive in a force fit the corresponding portions of the rim 50 and the outer wall 36 of the body 35. By reason of this fit, movement of the nipple element 21 outwardly of the fitting 20 or upwardly in say Figure 3, is prevented by the shape of the interfitting parts while movement of the nipple element in the opposite direction is prevented by friction due to the tight fit. As an additional means of preventing inward or downward movement of the nipple element say in Figure 3 the portions of the base 60 are swaged radially inwardly to form the inward radial base projections generally indicated by reference character 63. As shown in the drawings, the base 60 is preferably integral with the top wall 27.

The gripping spring element 23 is preferably composed of helically shaped resilient wire of rectangular cross section. The spring element preferably has the finally inner face thereof provided with a series of serrations 64 which are best seen in Figure 6, in which the blank 65 from which the gripping spring element 23 is later formed, is shown. The purpose of these serrations is to decrease the effective flexing diameter of the spring wire and to thereby increase its resiliency, and to increase the coefficient of friction between the inner surface of the helical spring and the outer wall of the conduit 34. In the form shown the gripping element 23 is in the form of a helical coil spring substantially one full turn. The transverse thickness of the wire blank 65, that is to say the distance between the inner surface 66 and the outer surface 67 is such that twice this thickness plus the external diameter of the conduit 34 is slightly greater than the internal diameter of the nipple element 21 immediately inwardly of the outer flange 39. The gripping element 23 is shown in the drawings as being wound in the same direction as a right hand thread, but this is a matter of choice and the device 20 will operate equally well if the element 23 is wound in the opposite direction. The pitch of the spring element 23 is preferably such that its greatest length axially, in an unstressed condition is substantially equal to or slightly greater than the distance between the inner surface (lower surface as viewed in Figures 3 or 18) of the outer flange and the inner surface (upper surface as viewed in Figures 3 or 18) of the flange 51. Thus in one of the operable seated positions thereof the upper or outer end 68 of the gripping spring element 23 may abut against the spring outer detent 45 (see Figure 12) while the lower or inner end 69 may abut against the spring inner detent 52 (see Figure 11). The gripping spring element 23 may be installed within the nipple element 21 by temporarily winding the same slightly about its axis to thereby reduce the effective diameter of said element, and inserting the same through the orifice formed by the outer flange 39. While I have shown the gripping element as including one complete turn or convolution this may be increased or decreased within certain limits. If more convolutions are used it may be necessary to increase the length of the nipple element 21, while reducing the spring length to less than one convolution may result in a reduction of the ultimate gripping area of the surface 66 against the outer wall of the conduit 34. As will appear as this disclosure proceeds most of the gripping takes place in the outer portions (the portions of least diameter) of the inner tapered walls 37 of the nipple element 21.

The rapid and efficient fabrication of the device 20 is a relatively simple procedure.

The gripping elements 23 may be manufactured by taking an indeterminate length of square section spring wire 65 in its soft or annealed state and striking the serrations 64 therein, and then coiling the same about a mandrel (not shown) of a size substantially equal to the size of the conduit 34. Next the coil is stretched out to get the proper inter-convolution spacing. Then a cut is run along one side of the coil parallel to the axis of the coil, and the individual elements 23 so formed are hardened and tempered.

Figure 16:
Figure 16 is a fragmentary vertical sectional view of a piece of strip stock or blank from which the nipple element is subsequently formed.
Figure 17:
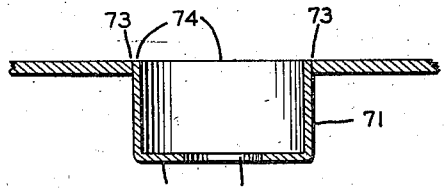
Figure 17 is a vertical sectional view showing a subsequent forming and blanking stage in the production of the nipple element.
Figure 18:
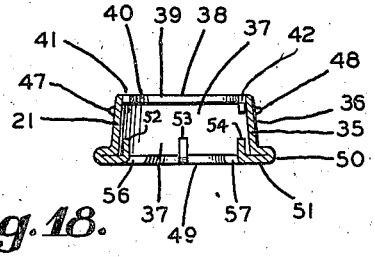
Figure 18 is a vertical sectional view showing the completely formed sheared and blanked nipple element.

The nipple element 21 may be produced by taking a piece of flat stock 70 (see Figure 16) and drawing a portion thereof to the cup shape 71, punching out the orifice 72, and severing the cup 71 from the stock 70 along a circular line 73. The edge of the orifice 72 is sheared and bent to form the detents 52–55 inclusive, and the edge 74 is sheared and bent to form the detents 45 and 46 and the protuberances 47 and 48. The edge 74 is bent inwardly through almost ninety degrees while the body 35 is forced inwardly toward its axis to form the proper taper in said body. The bottom wall 75 of the cup 71 is forced upwardly as viewed in Figure 17 to cause it and the side wall to mushroom out to form the folded rim 50 (Figure 18).

Figure 14:
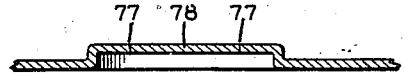
Figure 14 is a fragmentary vertical sectional view showing the first forming and blanking operation in the production of the retainer element.

The retainer element 22 is formed from flat stock 76 and is drawn and punched as shown in Figure 14. A circular cut is made along the line 77 and the disc 78 removed. Another drawing of the material bordering the line edge 77 produces the short cylindrical neck 62 with a taper to conform to the outer wall 36 just above the rim 50.

Assembly of the parts including the installation of the spring and the swaging of the base as previously described complete the fabrication of the device 20.

*Operation*

Assuming that the conduit 34 has been cut off substantially square and the burrs removed, as best seen in Figure 7, the end 80 of the conduit 34 is inserted downwardly between the outer flange 39. The effective internal diameter (the distance between opposed faces 66) is either such as to allow the conduit 34 to pass downwardly within the element 23 therebetween or to catch hold on said element. If the conduit catches hold it compresses the spring element 23 causing it to approach a flattened condition (see Figure 9). When the spring becomes flattened its effective internal diameter in a plane perpendicular to its axis becomes greater. This allows the conduit to penetrate the spring.

The conduit 34 is now passed downwardly as viewed in Figure 7 between the inner spring detents 52, 53, 54 and 55 which act as guides therefor until the end 80 strikes the conduit detents 56, 57, 58 and 59. This position is shown in Figure 3.

Next the conduit is slightly withdrawn from the nipple element 21 which causes the gripping spring element 23 to be drawn up into the narrower upper portion of the body portion 35 (see Figure 8). When the spring element 23 is thus drawn into the narrower portion of the nipple element 21 said gripping element 23 becomes wedged in between the outer surface of the conduit 34 and the inner wall 37. The conduit is now in its so-called locked position.

In order to release the conduit 34 it is only necessary to insert the pin 43 through one of the cut-outs 41 or 42 so as to permit pressure upon the handle 44 to force the gripping element 23 into a more flattened condition in the wider portion of the nipple element 21 adjacent the tops of the spring inner detents 52–55 inclusive. This condition is shown in Figure 9 and since the effective internal diameter of the gripping element 23 is now greater than the effective external diameter of the conduit 34, said conduit may be easily removed by elevating the same, as viewed in Figure 9.

Where it is desired to use the device 20 in so-called out-door use, it becomes necessary only to slip on the conduit element 34, the weatherproof cap 24 containing the gasket 25 before the said conduit is inserted into the nipple element 21. The cap 24 is provided with known bayonet-type slots which permit the cap to be engaged upon the protuberances 47—48, and drawn up snug until the gasket 45 forms a water-tight seal.

It may be seen that in the engagement of the conduit 34 in the device 20 that it is maintained in substantial alignment by the action of the inner surface 40 of the outer flange 39 and by the inner opposed surfaces of the guides or spring detents 52-55, inclusive. After the gripping element 23 has properly engaged the outer surface of the conduit 34, rotation of the conduit and gripping element is prevented by the engagement of the ends 68 and 69 of the spring element 23 against the nearest detents 45 and 46 and 52-55.

It may thus be seen that I have provided a novel and useful threadless conduit fitting which may be manufactured at low cost and yet which is durable and efficient in use. Connection and disconnection of conduit ends with my device may be rapidly and conveniently accomplished. Two of the fittings 20 may be placed back to back and used as a coupling between aligned ends of different conduits.

Electric conductors of the usual type may be drawn through the conduit and into and out of the fitting or the box with which it is associated in the usual manner.

I wish it to be understood that I do not desire to be limited to the exact details of construction shown and described, for obvious modifications will occur to a person skilled in the art.

I claim:

1. For use with a conduit, a fitting comprising: a nipple element having a tapering internal wall; and a gripping element in the form of a helical spring loosely positioned within said nipple element and between the outer wall of said conduit and the inner wall of said nipple element when said conduit is in an engaged position thereof within said nipple element, said helical spring directly contacting said conduit in the engaged position of the conduit.

2. For use with a conduit, a fitting comprising: a nipple element having a tapering internal wall; a gripping element in the form of a helical spring loosely positioned within said nipple element and between the outer wall of said conduit and the inner wall of said nipple element when said conduit is in an engaged position thereof within said nipple element; an inwardly extending flange disposed at the outer end of said nipple element; and a detent disposed within said nipple element and depending from said flange, said detent being disposed in the path of rotation of said gripping element.

3. An electrical conduit fitting comprising: a nipple element having a tapering inner wall; and a helical spring gripping element loosely positioned within said nipple element and adjacent said tapering wall, said gripping element having a serrated inner surface adapted to engage said conduit when said conduit is inserted into said nipple element.

4. An electrical conduit fitting comprising: a nipple element having a tapering inner wall; and a gripping element loosely positioned within said nipple element and adjacent said tapering wall; said nipple element at one end thereof having an inner flange, projecting inwardly from the body portion of said nipple element, said flange having a conduit detent extending in the path of travel of a conduit inserted into the other end of said nipple element.

5. An electrical conduit fitting comprising: a nipple element having a tapering inner wall; and a gripping element loosely positioned within said nipple element and adjacent said tapering wall; said nipple element at one end thereof having an inner flange, projecting inwardly from the body portion of said nipple element, said flange having a conduit detent extending in the path of travel of a conduit inserted into the other end of said nipple element; said inner flange having a spring inner detent disposed outwardly of said conduit detent and in the path of rotation of said gripping element.

6. In a device of the class described: a nipple element including a body element having an internally tapered wall, the inner end of said body having a folded peripheral rim extending radially outwardly from the body and radially inwardly to form a conduit detent extending into the path of travel of the conduit as inserted within the nipple element; a gripping element loosely associated with said tapering wall; and a retainer element having a rim receiving rabbet and a base; said rim being disposed within said rabbet; portions of said base being swaged over to secure said rim in position within said rabbet.

ADOLPH OLEVIN.